United States Patent [19]

Miranda

[11] Patent Number: 4,722,205
[45] Date of Patent: Feb. 2, 1988

[54] LOCKING DEVICE FOR BLOCKING AUTOMOBILE AND TRUCK STEERING WHEELS

[76] Inventor: Pablo V. Miranda, Retorno 44 no. 10 de la Avenida del Taller, Colonia Jardin Balbuena, Mexico City, Mexico

[21] Appl. No.: 350,030

[22] Filed: Feb. 18, 1982

[30] Foreign Application Priority Data

Apr. 27, 1981 [MX] Mexico .................................. 187.121

[51] Int. Cl.⁴ ............................................. E05B 13/10
[52] U.S. Cl. ........................................ 70/211; 70/213; 70/225; 70/227
[58] Field of Search .................. 70/210, 211, 213, 225, 70/226, 227, DIG. 57

[56] References Cited

U.S. PATENT DOCUMENTS

| | | | |
|---|---|---|---|
| 1,194,034 | 8/1916 | Koch | 70/227 |
| 1,277,994 | 9/1918 | Mottola | 70/213 |
| 1,341,925 | 6/1920 | Nimmo et al. | 70/213 X |
| 1,429,599 | 9/1922 | Liebowitz et al. | 70/227 X |
| 4,175,410 | 11/1979 | Schwaiger | 70/226 |
| 4,223,542 | 9/1980 | Basseches | 70/DIG. 57 X |

FOREIGN PATENT DOCUMENTS

| | | | |
|---|---|---|---|
| 522713 | 4/1921 | France | 70/211 |
| 456392 | 4/1950 | Italy | 70/211 |
| 153984 | 11/1920 | United Kingdom | 70/211 |
| 546096 | 6/1942 | United Kingdom | 70/227 |

*Primary Examiner*—Robert L. Wolfe
*Assistant Examiner*—Suzanne L. Dino
*Attorney, Agent, or Firm*—Young & Thompson

[57] ABSTRACT

A locking device for preventing rotation of a vehicle steering wheel, comprises a base having two hooks that engage over spokes of a steering wheel to be locked. A pair of spring clips releasably secure the base to the steering column which supports the steering wheel to be locked. An extensible and retractable pin carried by the base has a lock for preventing unauthorized retraction of the pin. A clamp encircles the steering column, the clamp having an ear having a hole therethrough for receiving the pin when the pin is extended. The clamp has an adjusting screw manipulable to release the clamp; and the screw has a screw head so positioned relative to the ear of the clamp that when the extensible and retractable pin is extended through the ear, the screw head is masked by the pin to prevent release of the clamp.

1 Claim, 2 Drawing Figures

LOCKING DEVICE FOR BLOCKING AUTOMOBILE AND TRUCK STEERING WHEELS

SUMMARY OF THE INVENTION

The present invention relates to a locking device for locking automobile and truck steering wheels.

The object of the invention is to prevent the theft of automobiles and trucks, by fastening and blocking the steering wheel, thereby preventing operation of the vehicle because the steering wheel must remain stationary.

Other objects and features of the present invention will become apparent from the following specification, taken in connection with the accompanying drawing, whose single figure shows an exploded perspective view of a locking device according to the present invention.

DETAILED DESCRIPTION OF THE PREFERRED EMBODIMENT

Figure 1:
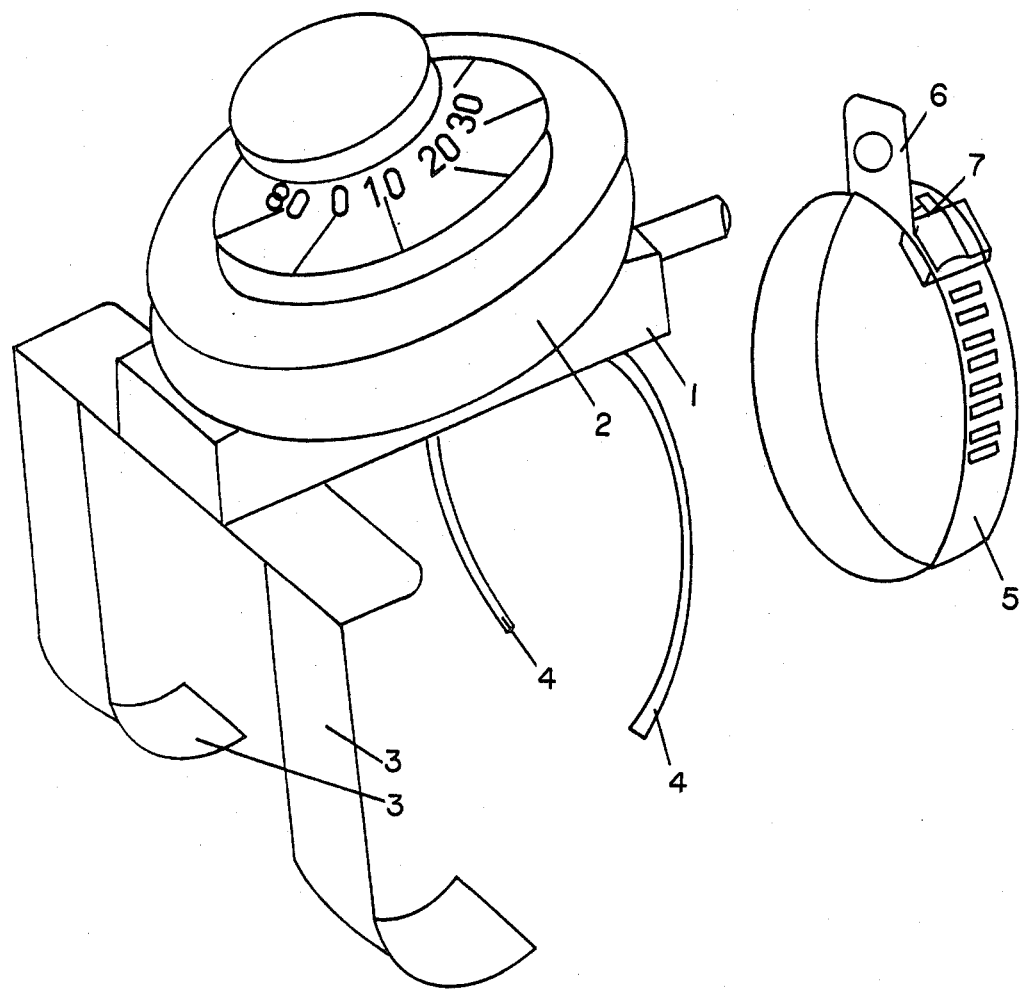
FIG. 1 is a perspective view of a locking device for automobile and truck steering wheels constructed in accordance with the present invention.
Figure 2:
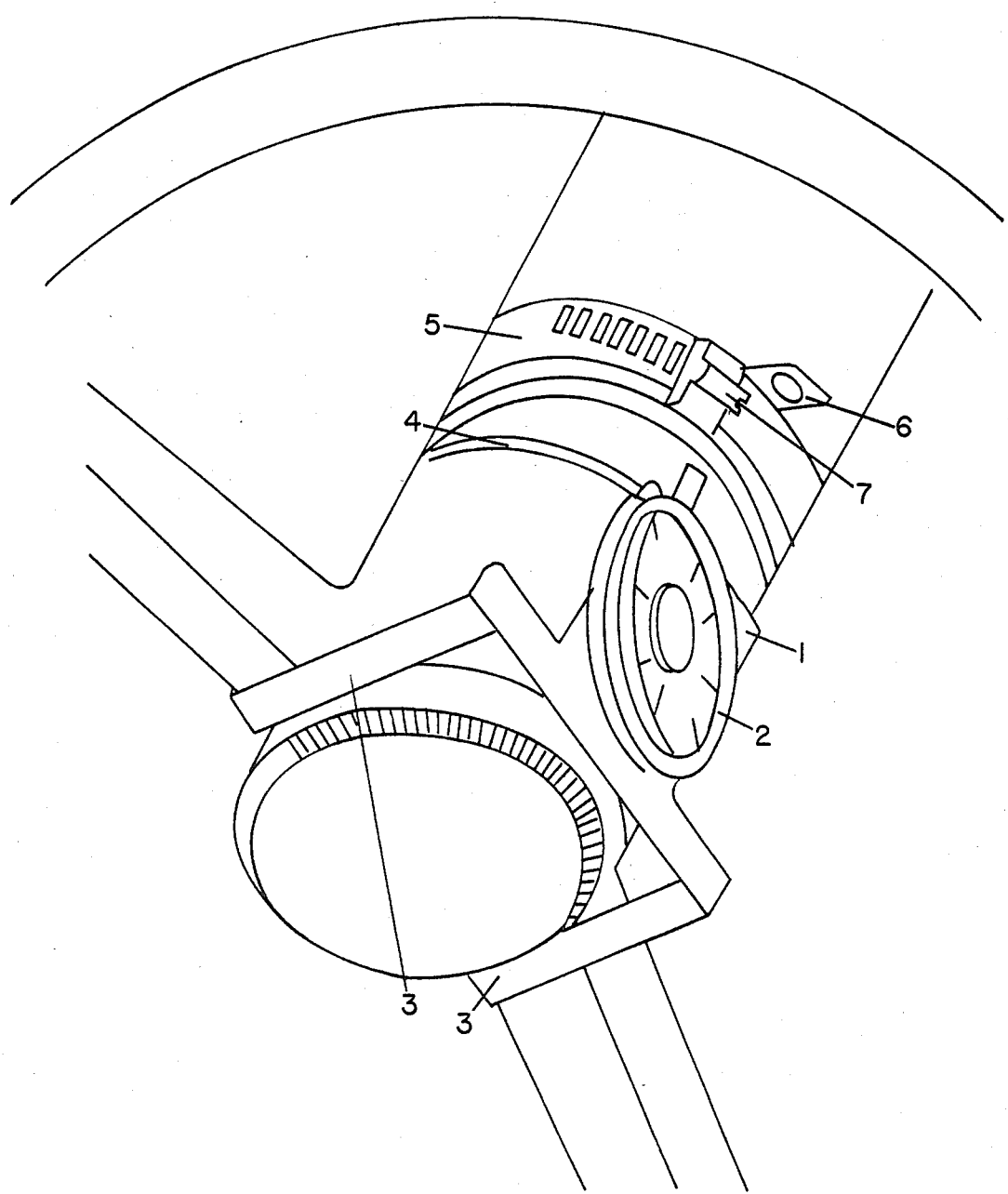
FIG. 2 is a perspective view showing the locking device of the present invention mounted on a steering wheel.

As shown in the drawing, the locking device of the present invention is divided into two parts, A and B. Part A comprises a rectangular base supporting a conventional combination lock or pin lock with an extensible and retractable pin, and two parallel claw-like devices at one end to be hooked about the spokes of a steering wheel.

At the other end of the rectangular base, arcuate spring clips are provided, for releasably gripping the steering column.

Part B comprises an adjustable clamp of the same diameter as the automobile or truck steering column. This clamp has an ear-like perforated part whose perforation receives the extensible and retractable pin of part A. The ear-like part is disposed adjacent a screw which adjusts the clamp and is used to remove the clamp. When the pin of the lock passes through the hole in the ear, this screw head is masked by the pin and is inaccessible and so the clamp cannot be removed from its position in which it clampingly encircles the steering column.

What is claimed is:

1. A locking device for preventing rotation of a vehicle steering wheel, comprising a base having two hooks that engage over spokes of a steering wheel to be locked, means for releasably securing the base to the steering column which supports the steering wheel to be locked, an extensible and retractable pin carried by the base, lock means for preventing unauthorized retraction of the pin, a clamp to encircle the steering column, the clamp having an ear having a hole therethrough for receiving the pin when the pin is extended, the clamp having an adjusting screw manipulable to remove the clamp, the screw having a screw head so positioned relative to said ear that when the extensible and retractable pin is extended through the hole in the ear, the screw head is masked by the pin to prevent removal of the clamp from about the steering column.

* * * * *